United States Patent [19]

Holdridge

[11] Patent Number: 4,690,415
[45] Date of Patent: Sep. 1, 1987

[54] HYDRAULIC NOSEPIECE ASSEMBLY FOR A COLLET CLOSER, AND METHOD

[76] Inventor: Warren B. Holdridge, 15224 S. Figueroa, Gardena, Calif. 90248

[21] Appl. No.: 896,968

[22] Filed: Aug. 15, 1986

[51] Int. Cl.⁴ .............................................. B23B 31/20
[52] U.S. Cl. ........................................ 279/4; 279/43; 279/50
[58] Field of Search ........................ 279/4, 43, 50, 1 R, 279/24, 46 R, 46 A, 49, 57; 409/233

[56] References Cited

U.S. PATENT DOCUMENTS

| | | | |
|---|---|---|---|
| 3,434,730 | 3/1969 | Smerkar | 279/4 |
| 3,835,649 | 9/1974 | Le Testu | 279/4 X |
| 3,880,046 | 4/1975 | Sessody | 279/50 X |
| 3,933,061 | 1/1976 | Link | 279/4 X |
| 3,977,065 | 8/1976 | Johnson | 279/4 X |
| 4,094,521 | 6/1978 | Piotrowski | 279/4 |
| 4,422,653 | 12/1983 | Piotrowski | 279/4 X |

Primary Examiner—Gil Weidenfeld
Assistant Examiner—Glenn L. Webb
Attorney, Agent, or Firm—Gene W. Arant

[57] ABSTRACT

A method and apparatus are shown for closing a spring collet upon a work piece in a lathe or similar machine tool, in which neither the work piece nor the collet is moved in the longitudinal or axial direction.

The collet closer has a nosepiece assembly within which an axially movable sleeve is provided. Movement of the sleeve causes the collet to open or close, in a radial direction, without axial dislocation of either collet or work piece.

The nosepiece assembly contains a hydraulic circuit which actuates the movable sleeve in response to movements of a draw bar.

2 Claims, 4 Drawing Figures

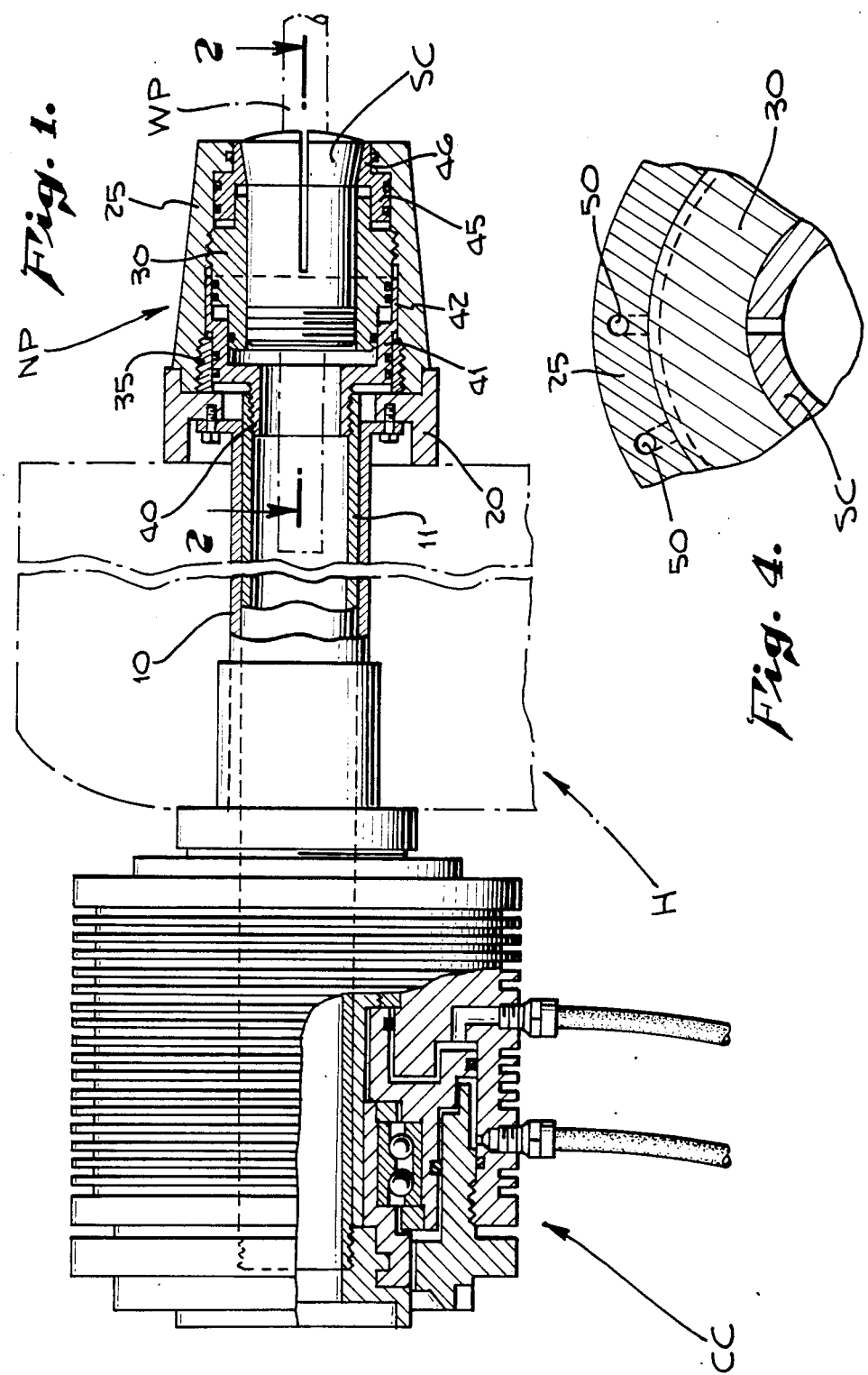

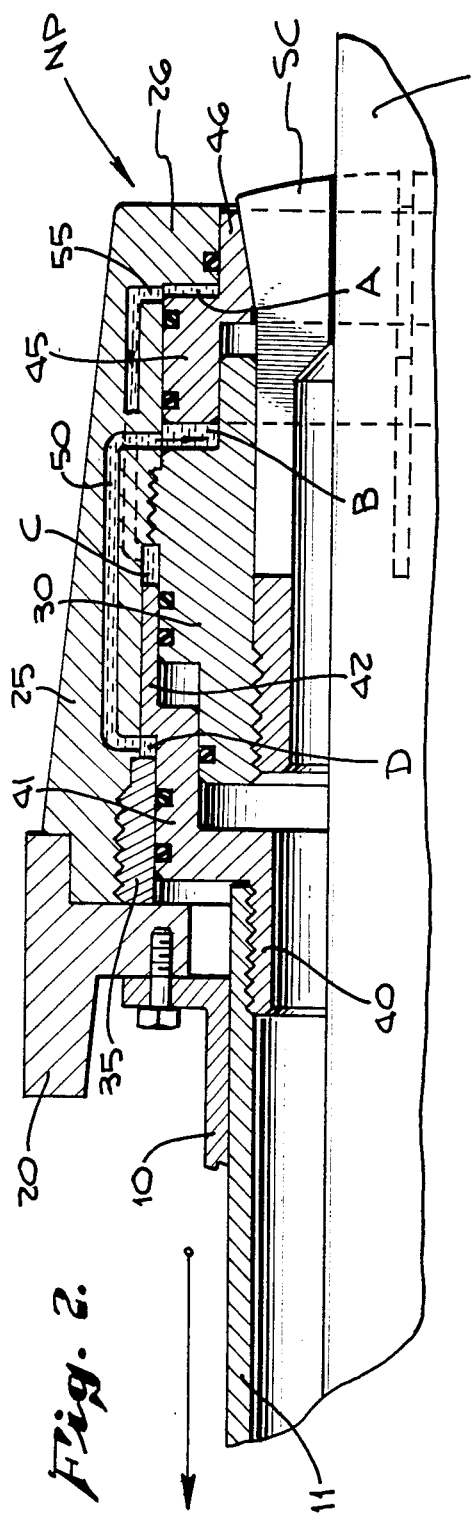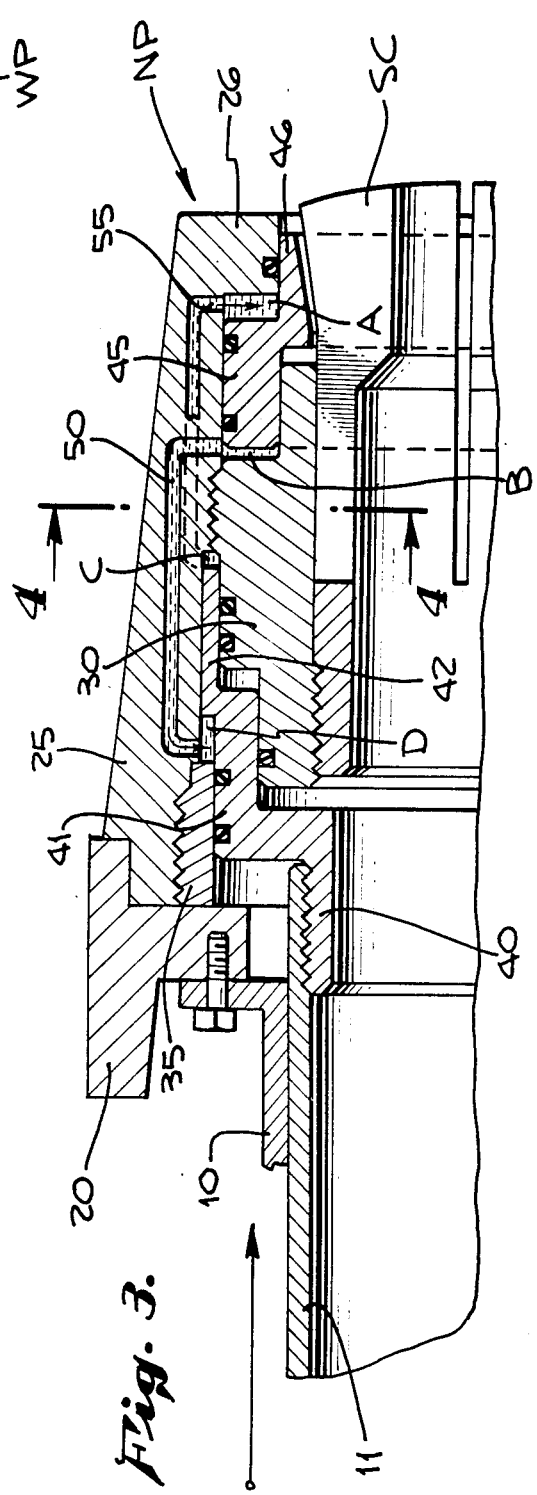

HYDRAULIC NOSEPIECE ASSEMBLY FOR A COLLET CLOSER, AND METHOD

BACKGROUND OF THE INVENTION

It has long been known in the art to utilize in a lathe or similar machine tool a spring collet which has a conically flared end that is longitudinally cut into three or more sections. Automatic collet closers are also well known. Typically, the collet closer includes a correspondingly shaped nosepiece which surrounds the collet, and a draw tube to axially draw the collet within the nosepiece, thus causing the collet to close upon a work piece that has been placed within it.

In general, and perhaps universally, the operation of an automatic collet closer has required a longitudinal or axial movement of the collet relative to the work piece.

My U.S. Pat. No. 3,361,433 issued Jan. 2, 1968 discloses an automatic collet closer which is operated hydraulically, by means of air pressure. This collet closer has been widely sold throughout the world for nearly twenty years. The headstock 10 of the machine lathe supports a rotatably driven hollow spindle 11 within which a hollow draw tube or draw bar 28 is positioned. The spindle 11 and draw bar 28 rotate in synchronism within the headstock 10, and a chuck 12 also rotates with them. Inside the chuck 12 are a hollow nosepiece 13a having a flared opening 14, and a spring collet 15 contained within the nosepiece. The collet closer, located rearwardly of the machine headstock, causes the draw bar 28 to move axially, and the spring collet 15 to move axially with the draw bar, so that the spring collet either closes upon a work piece B, or else opens to release the work piece, because of the interaction between the collet and the fixed nosepiece 13a.

In addition to my own collet closer referred to above, other collet closers have also been known and used, which operate to move a spring collet axially in order to close upon or release a work piece. Such other collet closers have also utilized a draw bar which is positioned inside a hollow spindle to rotate with the spindle, the draw bar being actuated in an axial direction to operate the collet.

SUMMARY OF THE INVENTION

The present invention provides an improved nosepiece assembly for a collet closer, in which the nosepiece assembly includes self-contained hydraulic circuits for controlling its operation.

According to the invention the spring collet does not move axially relative to the work piece. Instead, a floating sleeve that is part of the nosepiece assembly moves axially under direct control of the draw bar, and co-acts with the spring collet to cause the collet to open or close.

One advantage of the invention is that the hydraulic circuitry contained within the nosepiece assembly serves to reduce the operating demands upon the main part of the collet closer which is located to the rear of the headstock.

Another advantage of the invention is that since there is no axial movement of the collet, any tendency to alter the axial positioning of the work piece within the machine tool is avoided. This in turn makes axial realignment of the work piece unnecessary and thereby saves operator time.

One object of the invention, therefore, is to provide an improved nosepiece assembly for a collet closer, which reduces operating demands on the main collet closer mechanism.

Another object of the invention is to provide an improved nosepiece for a collet closer, which avoids axial movements of the spring collet.

A further object of the invention is to provide a novel method of controlling the operation of a spring collet such that the collet is not required to, and does not, move axially or longitudinally relative to its associated work piece.

DRAWING SUMMARY

FIG. 1 is a side elevation view of a collet closer which incorporates my new nosepiece assembly, the headstock of an associated machine tool being shown in dotted lines;

FIG. 2 is an enlarged cross-sectional view taken on the line 2—2 of FIG. 1, showing the collet in its closed position;

FIG. 3 is a view like FIG. 2 but showing the collet in its open position; and

FIG. 4 is a fragmentary cross-sectional view taken on the line 4—4 of FIG. 3.

DESCRIPTION OF PREFERRED EMBODIMENT

Reference is now made to the drawings for a description of the presently preferred embodiment of the invention.

As shown in FIG. 1, the headstock H of a lathe or other machine rotatably supports a hollow spindle 10. A draw bar 11, also in the form of a hollow tube, is disposed inside the spindle. To the left or rearward side of the headstock H is shown a collet closer CC which may, for example, be of the type disclosed in my above-identified issued patent. Spindle 10 is rotatably driven from the lathe or other machine tool, in a conventional manner, not specifically shown. The rearward end of draw bar 11 is rotatably supported within the collet closer CC, and is selectively moved in a longitudinal or axial direction by the collet closer, as is well known in the art.

Also shown in FIG. 1 at the right-hand or forward side of the headstock H is my novel nosepiece assembly which is generally designated as NP. Within the nosepiece assembly NP is a conventional spring collet SC, and a work piece WP (shown only in dotted lines) is grasped within the collet.

Reference is now made to FIGS. 2-4 which show my novel nosepiece assembly in greater detail. A generally circular adapter plate 20 is attached to the forward end of the spindle 10. A nosepiece housing 25, of generally conical configuration, is attached to the forward side of adapter plate 20. At its forward end the housing 25 has an inturned circumferential flange 26. A floating sleeve 45 (which during assembly is inserted from the rearward end of the nosepiece housing) is captured within the forward end of the housing. Floating sleeve 45 has a generally Z-shaped cross-sectional configuration. Its inner and forward part 46 is of smaller diameter than the main part of the sleeve, and this inner part has an inner surface which is conically flared and slidingly engages the conically flared outer surface of the spring collet SC.

In the operation of my nosepiece assembly, the floating sleeve 45 moves axially back and forth, releasing or grasping the flared portion of the collet in order to release or grasp the work piece. The collet itself, however, remains in a fixed axial position, as will now be described.

An inner nut 30 is threadedly secured inside the nosepiece housing 25 in order to fully constrain the movements of the floating or sliding sleeve 45. Near its rearward (left-hand) end the inner nut 30 has an interior threaded surface, to which is threadedly secured the rearward end of the spring collet SC. Thus, adapter plate 20 is secured to spindle 10, nosepiece housing 25 is secured to adapter plate 20, nut 30 is secured within housing 25, and collet SC is fixedly secured within nut 30. Since spindle 10 does not move axially, neither does the spring collet.

A draw tube extension sleeve 40 is attached to the forward end of draw tube 11. It has a stepped portion 41 which is of larger diameter, and another stepped portion 42 which is of still larger diameter. An outer nut 35 is threadedly fastened within the rearward end of nosepiece housing 25, and captures extension sleeve 40 for constrained movement within the housing, since the stepped portion 42 cannot move past that nut.

Sleeve 40 is grasped between the inner nut 30 and the outer nut 35. Nosepiece housing 25 is drivingly rotated by spindle 10. The draw tube 11 and its extension sleeve 40 also rotate with the housing 25. Draw tube 11 is concentric to spindle 10 but loosely fitted therein.

The sleeves 45 and 40 operate, in effect, as hydraulic pistons. A cavity A is formed between flange 26 of the housing 25 and the larger diameter portion of sleeve 45. A cavity B is formed between the rearward end of the large diameter part of sleeve 45 and the forward end of nut 30. A cavity C is formed between the enlarged forward end portion 42 of sleeve 40 and a circumferential shoulder that is formed in the inner wall of the nosepiece housing 25 behind the outer thread of nut 30. And a cavity D is formed between a circumferential shoulder formed on the rearward end of portion 42 of extension sleeve 40 and a forwardly facing circumferential shoulder formed on the forward end of nut 35.

A set of first oil passages 50 are formed within the housing 25, connecting cavities D and B, while a set of second oil passages 55 connect cavities C and A. The cavities A, B, C, and D, and the oil passages 50 and 55, remain filled with oil when the apparatus is in use.

OPERATION

Assuming that spring collet SC is open, the operation is as follows. The collet closer CC (left side of FIG. 1) is activated and forces the draw tube 11 rearward, away from the nosepiece. Extension sleeve 40 moves with the draw tube. The rearward motion of sleeve 40 forces the oil or other non-compressible hydraulic fluid from cavity D into cavity B. The increased amount of fluid in cavity B causes the floating sleeve 45 to move forward, thereby closing the collet SC. At the same time, the movement of sleeve 45 forces fluid from cavity A into cavity C.

There is a mechanical advantage involved in this operation of the hydraulic circuits. More specifically, the surface areas of floating sleeve 45 which bear on the cavities A and B are approximately three times the size of the surface areas of extension sleeve 40 (portion 42 thereof) which bear on cavities C and D. As a result, the air pressure required to operate collet closer CC is reduced to one-third while maintaining the same closing pressure on the collet. For example, if it formerly required 90 PSI to operate the collet closer CC, with the present invention only 30 PSI will be required. This reduces the operating demands on the collet closer CC. Extension sleeve 40 travels farther than floating sleeve 45, but the hydraulic force applied to sleeve 45 is greater. A multiplier of about three is preferred, but in any event it is preferred to apply a substantially greater force to floating sleeve 45.

When the spring collet is closed and is to be opened, the operation is as follows. Collet closer CC forces the draw tube 11 forward, toward the nosepiece. The forward motion of extension sleeve 40 forces hydraulic fluid from cavity C into cavity A, which forces the floating sleeve 45 rearward, thus relieving its grip on the spring collet and permitting the collet to open by its own spring action. The rearward motion of sleeve 45 forces hydraulic fluid from cavity B into cavity D, thus preparing the nosepiece for the collet closing operation.

It will be evident that the extension sleeve 40 and the floating sleeve 45 are in a master and slave relationship. When sleeve 40 advances, sleeve 45 moves rearwardly, and vice versa.

It is pointed out that although the present invention has been shown and described with reference to a particular embodiment, nevertheless various changes and modifications, obvious to one skilled in the art to which the invention pertains, are deemed to lie within the purview of the invention.

I claim:

1. In a machine tool having a rotating hollow spindle and a drawbar disposed within the spindle and rotatable therewith, and a spring collet supported from the spindle and which has a conical nose part for selectively capturing and holding a work piece, the method of closing the collet comprising the steps of:
   selecting a sleeve having in its forward end a flared opening which is adapted to selectively engage the conical nose part of the collet;
   placing the sleeve about the collet;
   supporting the sleeve from the spindle for axially slidable movement relative thereto;
   axially reciprocably moving the draw bar; and
   in response to each axial movement of the draw bar, axially moving the sleeve in the opposite direction so as to either open or close the collet;
   whereby the work piece is maintained in a fixed axial position relative to the spindle.

2. In a machine tool having a rotatably driven hollow spindle adapted to receive a work piece, and a draw bar disposed within the spindle and axially reciprocably movable therein for selectively securing the work piece in the spindle or releasing it therefrom, an improved collet closer nosepiece assembly comprising, in combination:
   a nosepiece housing attached to and fixedly supported from the spindle;
   a spring collet disposed within said nosepiece housing, having a generally cylindrical base part and a conical nose part, said base part being fixedly supported both axially and radially from said nosepiece housing;
   a floating sleeve concentrically disposed within the forward end of said nosepiece housing and about said conical nose part of said collet, said floating sleeve being axially reciprocably movable and having in its forward end a flared opening for selectively engaging said conical nose part of said collet;
   means coupling the draw bar to said floating sleeve so that the axial movement of said draw bar controls the axial movement of said sleeve for selectively opening or closing said collet;

said coupling means including a draw bar extension sleeve attached to said draw bar and movable therewith, and hydraulic circuit means coupling said floating sleeve to said draw bar extension sleeve so that said two sleeves move in concert but in opposite directions; and the axial travel of said extension sleeve being substantially greater than the axial travel of said floating sleeve, and the hydraulic force applied to said floating sleeve being correspondingly greater than the hydraulic force applied to said extension sleeve;

whereby the axial position of the work piece relative to the spindle is unaffected by the closing or opening operations of the collet.

* * * * *